Oct. 1, 1963 SANJIRO MAEJIMA 3,105,647

TAPE WINDING APPARATUS

Filed Jan. 26, 1962 3 Sheets-Sheet 1

SANJIRO MAEJIMA
INVENTOR.

BY Wenderoth, Lind & Ponack
ATTORNEYS

Oct. 1, 1963 SANJIRO MAEJIMA 3,105,647

TAPE WINDING APPARATUS

Filed Jan. 26, 1962 3 Sheets-Sheet 2

Sanjiro Maejima

INVENTOR.

BY Wenderoth, Lind and Ponack,

Attorneys

Oct. 1, 1963 SANJIRO MAEJIMA 3,105,647

TAPE WINDING APPARATUS

Filed Jan. 26, 1962 3 Sheets-Sheet 3

Sanjiro Maejima
INVENTOR.

BY Wenderoth, Lind and Ponack, Attorneys

United States Patent Office 3,105,647

Patented Oct. 1, 1963

3,105,647
TAPE WINDING APPARATUS

Sanjiro Maejima, 2619 1-chome, Sanno, Ota-ku, Tokyo, Japan

Filed Jan. 26, 1962, Ser. No. 168,903
3 Claims. (Cl. 242—66)

The present invention relates to new and improved tape winding apparatuses and more particularly to a novel tape winding apparatus capable of winding up a character tape or perforated tape which has been transmitted from an apparatus, such as a statistical machine, communication apparatus, or teletype, in a properly tightened state without adoption of a driven winding shaft.

Heretofore, in the conventional tape winding apparatuses such as described above, the winding core shaft is rotated directly or indirectly by a driving motor. In these apparatuses, however, since a constant speed driving motor should be used, peripheral velocity and accordingly winding speed increase with the increase of the outer diameter of the wound tape. Accordingly, in the conventional tape winding apparatuses, a so-called friction driving system for making a moving part slip by an amount corresponding to the speed difference has been adopted, so that they have become very complicated in construction and have come to be accompanied by various other disadvantages.

Therefore, it is an object of the present invention to provide a tape winding apparatus having none of the disadvantages of the conventional apparatuses.

It is another object of the present invention to provide a tape winding apparatus which is simple and small in construction and can wind up a wound tape having a large diameter.

The above object and other objects of the present invention have been attained by an improved apparatus wherein a few turns of the tape to be wound is wound up around a core body and this core body is clamped between friction rollers of a pair which are rotated in such a direction while clamping the core body and wound tape that the tape part following the previously wound part is successively wound up around the core body.

According to this invention, a tape can be always wound up at a constant speed by means of two opposite friction rollers, and it is not particularly necessary to support the core body in a stationary installation state. Accordingly, the apparatus of this invention has various advantages such as that the apparatus can operate with very low driving power, it is possible to wind up a wound tape having a relatively large diameter by merely providing suitable guide members, and the wound tape can be caused to assume such a tightened state as to necessitate no finishing treatment.

The details of the present invention and its principle as well as the manner in which the objects and advantages of the present invention may best be attained will be understood more fully from a consideration of the following description taken in conjunction with the accompanying drawings, in which the same or equivalent parts are designated by the same reference numerals or characters, and in which.

*Example 1*

Figures 1, 2:
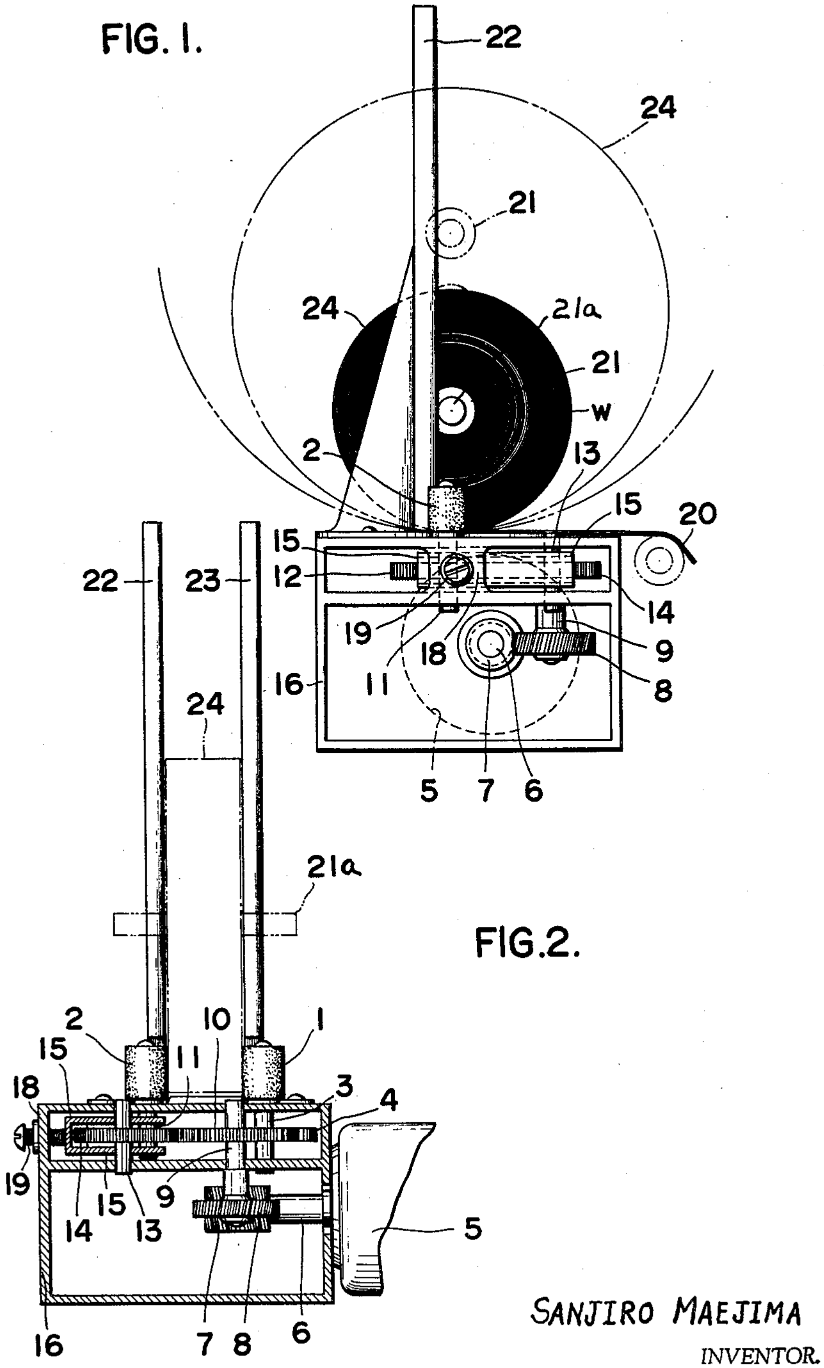
FIG. 1 is a side elevational view of one example of the present invention.
FIG. 2 is a front elevational view, in section, of the example of FIG. 1.
Figure 3:
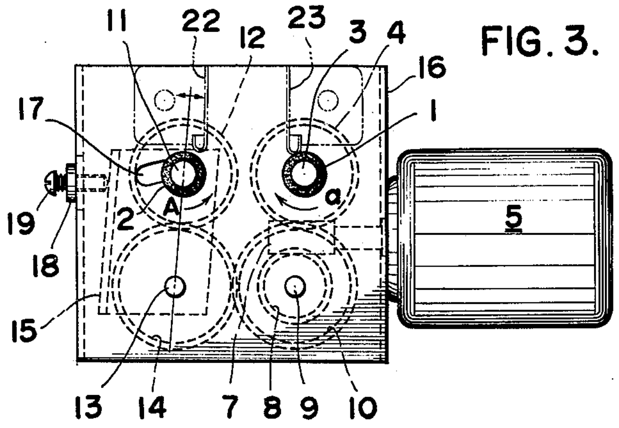
FIG. 3 is a plan view of the example of FIGS. 1 and 2.

Referring to FIG. 1 to FIG. 4, the apparatus comprises two opposed friction rollers 1 and 2. The roller 1 is driven by a driving motor 5 through a driving shaft 6 of the said motor 5, a worm gear 7 fixed to said shaft 6, a worm wheel 8 meshed with the said worm gear 7, a main gear 10 fixed to the main shaft 9 of the said worm wheel 8, and a gear 4 meshed with the said gear 10 and fixed to the shaft 3 of the roller 1. The other roller 2 is in indirect engagement with the main gear 10 through a gear 12 fixed to the shaft 11 of the roller 2 and an intermediate gear 14 meshed with the said gears 12 and 10, said gear 14 being supported by an intermediate shaft 13. The intermediate gear 14, intermediate shaft 13 and the gear 12 of the friction roller 2 are supported, as one assembly, by a rockable frame 15 which can be rocked around the intermediate shaft 13. The shaft 11 of the friction roller 2 is supported by the said frame 15 at its portion near the rocking periphery thereof. Accordingly, the shaft 11 of the friction roller 2 can be rocked along an arcuate slot 17 perforated on the surface of the frame casing 16, but the range of the said rocking of the shaft 11 is limited by an adjustable screw 19 screwed in the side wall 18 of the said frame casing 16.

The operation of the apparatus of FIGS. 1–4 will be described below. At first, a few turns of a tape 20 transmitted from any communication apparatus such as a teletype not shown is wound around a core body member comprised of a core body 21 having an axle 21*a* therethrough and on which the core body is fixed. The axle 21*a* is disposed, as shown in FIG. 1, against the side face of the stud posts 22 and 23 which are uprightly erected on the said frame casing 16. In this state, the driving motor 5 is started, then the gear 4 is rotated, by way of the main gear 10, together with the friction roller 1 in the direction of the arrow line *a* in FIG. 3, and the gear 12 is rotated, by way of the main gear 10 and the intermediate gear 14, together with the friction roller 2 in the direction of the arrow line A in FIG. 3. In this state, if the rockable frame 15 is pressed by the adjustable screw 19, the friction roller 2 is pressed against a side surface of the core body 21 and the wound tape 24, whereby both side surfaces of the wound tape 24 are clamped between the rollers 1 and 2. Accordingly, this wound tape 24 rotates in the direction of the arrow line W in FIG. 1, whereby the tape 20 is successively wound up. With the increase of the outer diameter of the wound tape, the core body 21 ascends gradually, the reel of tape resting on the layers of tape between the core 21 and the surface of housing 18 and axle 21*a* rolling in contact with the stud posts 22 and 23. Since during the said operation, the wound tape 24 rotates in the direction of the arrow line W, and the axle 21*a* on the core body 21 is being continuously rotated and will tend to roll against the stud posts 22 and 23, the wound tape 24 is prevented from falling off. Likewise during unwinding, the axle 21*a* will tend to roll against the stud posts 22 and 23.

Figure 4:
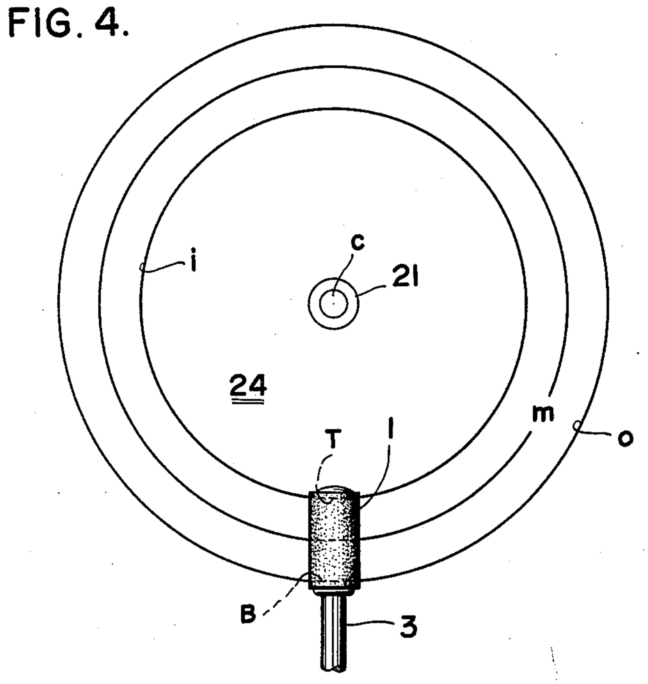
FIG. 4 is an enlarged side elevational view of a friction roller and wound tape for describing operation thereof.

Tape winding operation will be more particularly described below in connection with FIG. 4.

Since the friction rollers 1 and 2 are of cylindrical form, there is a difference between the winding velocity caused by the end parts T of the rollers 1 and 2 and that caused by the root parts of the rollers 1 and 2. That is, since the diameter of the wound tape 24 decreases from the outermost peripheral portion O toward the center C thereof, the peripheral velocities at the peripheries O, *m*, and *i* are different from one another even when the rotational speed of the rollers is constant at all parts along their axial direction. However, according to this invention, peripheral velocities at all positions including the end part T, root part B, and any intermediate part of the friction roller are semi-compulsorily unified. It seems that the said unification is due to a phenomenon whereby the differences between the peripheral velocities at different portions are mutually suppressed in the form of slip between the surface of the roller and side surface of the tape.

As a result of my experiments, I have found that the said slip phenomenon causes an increase in the tightness of the wound tape, whereby the wound tape is prevented from becoming unwound or loose even when the core body 21 is drawn off after completion of winding of the tape and does not become loose even when it is carelessly dropped. The diameter of the wound tape depends upon the height of the stud posts. That is, it is possible to wind the tape until the radius of the wound tape becomes equal to the height of the stud posts. Accordingly, in spite of the very small-sized construction of the apparatus, wound tape having very large diameter can be obtained.

*Example 2*

Figures 5, 6:
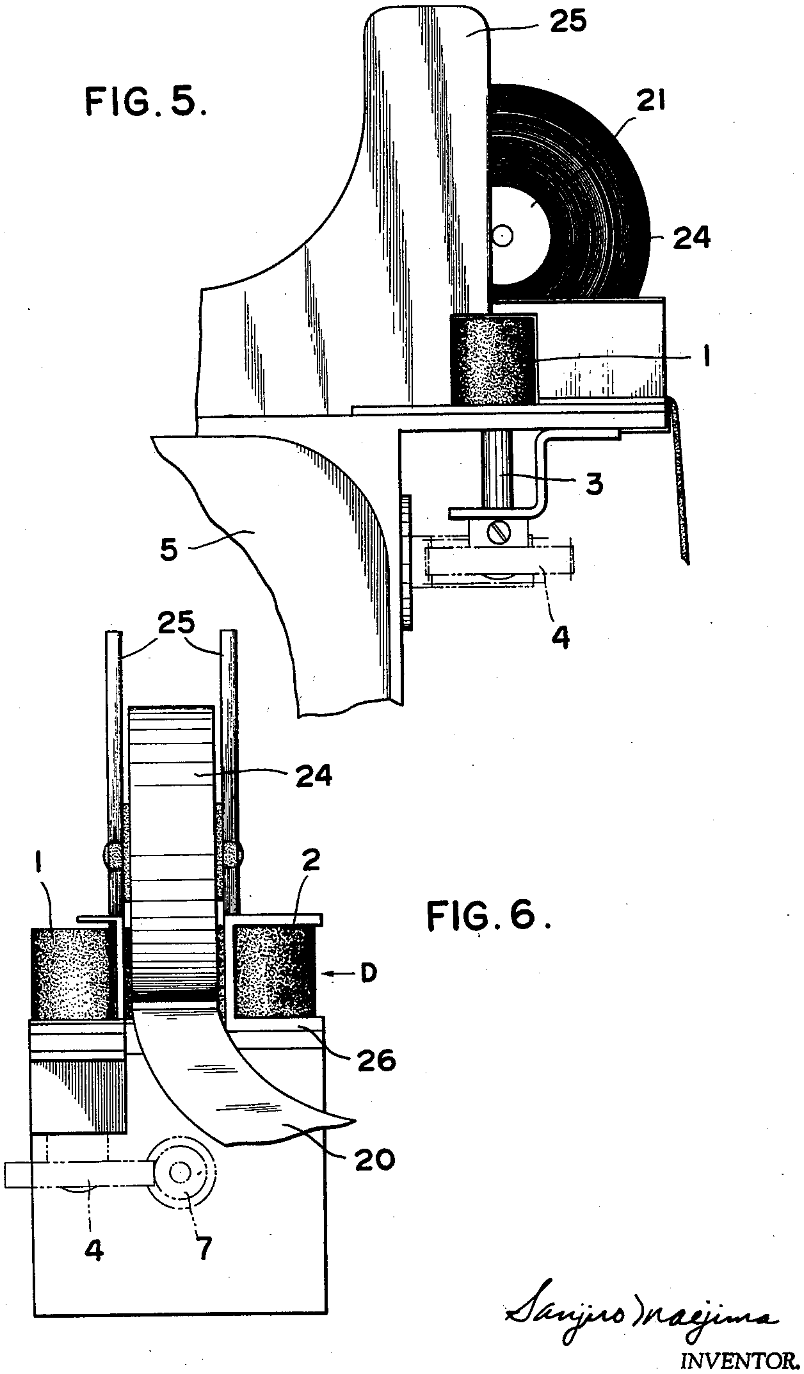
FIG. 5 is a front elevational view of another example of the present invention.
FIG. 6 is a side elevational view of the example of FIG. 5.

In the example of FIGS. 5 and 6, the apparatus comprises a pair of friction rollers 1 and 2, a worm wheel 4 fixed to the shaft 3 of the roller 1, a worm gear 7 meshed with the said worm wheel 4, and guide frames 25, said worm gear 7 being driven by an electric motor 5 in the same manner as in Example 1. A wound tape 24 and its core body 21 are clamped between the rollers 1 and 2, and a roller bracket 26 holding the roller 2 is pressed toward the arrow line D by a spring which in turn is not shown, whereby a frictional force is produced between the core body 21 and the rollers, thus transmitting the torque of the roller 1 to the core body 21 so as to wind up a tape 20 around the core body 21 in the same manner as in the case of Example 1. By this winding operation, the roller 2 is frictionally rotated. In this example, since the tape 20 and core body 21 are clamped between both friction rollers 1 and 2, the roller 1 accepts driving power from the electric motor 5, and a frictional force necessary to wind up the tape is produced by the roller 2, the core body 21 is made to rotate so as to wind up the tape at a constant velocity in a tight state. As described above, in this example, only one friction roller 1 acts as a driving roller and another roller 2 is pressed toward the roller 1 by a spring of its bracket 26 so as to produce merely a friction force. Accordingly, the roller 2 cannot rotate by itself, but can be rotated by rotation of the core body 21, and the core body 21 cannot rotate merely by the torque of the roller 1, but can be rotated upon receiving a frictional force between itself and the roller 2.

According to the second example, a tape can be surely wound up at a constant speed by the use of a very simple apparatus including a pair of friction rollers, a pair of gears, a pair of guide members, and a driving motor.

Since it is obvious that many changes and modifications can be made in the above-described details without departing from the nature and spirit of the invention, it is to be understood that the invention is not to be limited to the details described herein except as set forth in the appended claims.

What is claimed is:

1. A tape winding apparatus comprising a core body member for winding a tape therearound, a horizontal base, two opposed friction rollers disposed on said base with their axes of rotation in a vertical position so as to clamp both side surfaces of said core body member and a wound tape wound on said core body member between them, a driving device coupled with at least one of the said rollers so as to drive it, and a pair of spaced uprights fixed adjacent to said rollers on the side of said rollers toward which the portion of said one roller closest to the other roller is rotating, said uprights being spaced from each other a distance slightly greater than the width of the tape to be wound, said core body member resting against the faces of said uprights toward said rollers, whereby said core body is rotated and accordingly a tape thereon is wound by the rotation of the said rollers.

2. A tape winding apparatus according to claim 2, wherein one of said two rollers is mounted for pivoting movement around a shaft parallel to and spaced from the center axis of the shaft of the said roller for movement toward and away from the other roller, whereby adjustment of the clamping force imparted to the wound tape is made possible by adjusting the position of the said pivotable roller.

3. A tape winding apparatus comprising a core body member for winding a tape therearound, a horizontal base, two opposed friction rollers disposed on said base with their axes of rotation in a vertical position to clamp both side surfaces of the said core body member and wound tape, a driving motor, a gear train coupling one of the said rollers to the said driving motor and a spring pressing the other of the said rollers against the said core body member and wound tape so as to produce a frictional force which is necessary to wind up the tape by means of the two rollers, and a pair of spaced uprights fixed adjacent to said rollers on the side of said rollers toward which the portion of said one roller closest to the other roller is rotating, said uprights being spaced from each other a distancee slightly greater than the width of the tape to be wound, said core body member resting against the faces of said uprights toward said rollers.

References Cited in the file of this patent

UNITED STATES PATENTS

| | | |
|---|---|---|
| 795,507 | Hatfield et al. | July 25, 1905 |
| 1,155,309 | Heckel | Sept. 28, 1915 |
| 1,437,915 | Sentou et al. | Dec. 5, 1922 |
| 1,549,585 | Marcellus | Aug. 11, 1925 |
| 2,387,644 | Coffey | Oct. 23, 1945 |
| 2,479,809 | Bohlin | Aug. 23, 1949 |
| 2,830,775 | Kiesel | Apr. 15, 1958 |